United States Patent
Rothberg et al.

(10) Patent No.: US 6,289,484 B1
(45) Date of Patent: Sep. 11, 2001

(54) DISK DRIVE EMPLOYING OFF-LINE SCAN TO COLLECT SELECTION-CONTROL DATA FOR SUBSEQUENTLY DECIDING WHETHER TO VERIFY AFTER WRITE

(75) Inventors: Michael S. Rothberg, Foothill Ranch; Jonathan Lee Hanmann, Anaheim, both of CA (US)

(73) Assignee: Western Digital Technologies, Inc., Lake Forest, CA (US)

(*) Notice: Subject to any disclaimer, the term of this patent is extended or adjusted under 35 U.S.C. 154(b) by 0 days.

(21) Appl. No.: 09/314,871

(22) Filed: May 19, 1999

(51) Int. Cl.[7] .............................. G11C 29/00; G11B 5/09
(52) U.S. Cl. ..................... 714/769; 714/762; 714/766; 360/53
(58) Field of Search ......................... 714/769, 766, 714/762, 704, 710; 360/31, 53, 54, 47; 369/53.15; 11/53.42

(56) References Cited

U.S. PATENT DOCUMENTS

| | | | |
|---|---|---|---|
| 5,872,800 | * | 2/1999 | Glover et al. ..................... 714/766 |
| 5,909,334 | * | 6/1999 | Barr et al. ........................ 360/53 |
| 6,034,831 | * | 3/2000 | Dobbek et al. .................... 360/53 |
| 6,043,945 | * | 3/2000 | Tsuboi et al. ..................... 360/53 |

* cited by examiner

Primary Examiner—Emmanuel L. Moise
(74) Attorney, Agent, or Firm—Milad G Shara

(57) ABSTRACT

A disk drive that includes a disk defining a multiplicity of sectors operates in accord with a method comprising the steps of providing a firmware-controlled state machine which can be in any of a plurality of states including an off-line in-progress state. While the state machine is in the off-line in progress state; a firmware-controlled scan of the multiplicity of sectors is performed. While performing the firmware-controlled scan, steps are performed to maintain a list of sector identifiers such that each sector identifier in the list points to a sector that has failed, preferably repeatedly, to provide valid data on the fly. While the state machine is not in the offline in-progress state; the drive responds to a request to write data at a specified sector by determining whether the specified sector matches a sector identifier in the list, and if so, autonomously performing a read-verify-after-write operation.

3 Claims, 13 Drawing Sheets

| Sector Identifier Field | Tare Flag | Relocation | Bad Block | Offset |
|---|---|---|---|---|
| LBA A | 0 | 1 | 0 | Offset A |
| LBA B | 1 | 1 | 0 | Offset B |
| ... | ... | ... | ... | ... |
| LBA i | 1 | 0 | 0 | Offset i |
| LBA Z | 0 | 0 | 1 | Offset Z |

RBB LIST

FIG.13

DISK DRIVE EMPLOYING OFF-LINE SCAN TO COLLECT SELECTION-CONTROL DATA FOR SUBSEQUENTLY DECIDING WHETHER TO VERIFY AFTER WRITE

CROSS REFERENCE TO RELATED APPLICATION

The subject matter of this application is related to the subject matter of an application U.S. Ser. No. 09/138,805, titled "DISK DRIVE HAVING DATA-GUARDING FIRMWARE," filed in the USPTO on Aug. 21, 1998, in the name of Michael Rothberg, and assigned to the assignee of this application (the "Data Guarding application"). The disclosure of the Data Guarding application is hereby incorporated by reference herein.

BACKGROUND OF THE INVENTION

In general, this invention relates to hard disk drive technology. More particularly, it relates to a hard disk drive that employs an off-line scan to collect and store selection-control data for subsequently deciding whether to verify after write.

Customer requirements for hard disk drives include challenging specifications for performance (access time, data throughput, etc.) and capacity (contemporary capacity specifications are well in excess of 1 gigabyte per drive). These customer requirements also include exacting standards with respect to data-reproduction reliability. Ideally, output data from a hard disk drive would always accurately and completely reproduce input data previously transferred to be stored by the disk drive. As a practical matter, defects either in the construction or operation of a drive inevitably occur, and such defects pose problems in meeting customer specifications which have as one of their purposes to ensure that any such defect does not cause data loss.

Such defects can involve media defects which may be localized and may be a repeatable source of error. Various defects in operation can involve high-fly writes, thermal asperities, random noise, etc.

Disk drive technology presently provides for error detection and multiple levels of error-correction capability making it possible for a drive to return the same data to the host even though, internally within drive operation, some type of defect caused corrupted data to be read. A robust process for error detection entails an encoding process and a decoding process. In the encoding process, data received from a host is combined with redundancy data to form codewords which are written to disk. In the decoding process, syndromes are generated, and the syndromes indicate whether valid data (i.e., codewords) or corrupted data have been read. One level of error correction capability is referred to as "on-the-fly" error correction. There are limits to the capability of on-the-fly error-correction capability. For example, some contemporary drives provide a "T=6" limit, which means that each of up to six invalid bytes within a codeword can be corrected on the fly. If corrupted data have been read within the capability of the on-the-fly level, then an error-locator and error mask are quickly generated and the corrupted data are promptly corrected. The on-the-fly level of error-correction does not require a retry and accordingly does not suffer from the penalty of substantial rotational latency. Others of the multiple levels are generally microprocessor controlled, and considerably more time consuming. Under microprocessor control a sector that failed to provide valid data on the fly can be re-read on a subsequent revolution of the disk. Sometimes, a sector that failed to provide valid data on the fly on one try will, on a retry, provide valid data on the fly. If a sector has repeatedly failed to provide valid data on the fly, certain "heroic" measures can be taken such as repositioning of the head stack assembly in advance of a retry. Furthermore, assumptions can be made as to the location of errors, and microprocessor-controlled error-correction processes can be carried out.

Additional background information relevant here is set forth in a U.S. Patent Application referred to herein as the "Barr Application"; that is, Ser. No. 08/644,507, filed May 10, 1996, now U.S. Pat. No. 5,909,334, entitled "VERIFYING WRITE OPERATIONS IN A MAGNETIC DISK DRIVE" which names L. Barr and A. Sareen as joint inventors and which is assigned to the assignee of this application. The disclosure of the Barr Application is hereby incorporated herein. Briefly, the Barr Application discloses a method of operating a drive that is connected to a host computer and that includes a rotating magnetic disk and a buffer memory. The method of the Barr Application comprises the steps of receiving a block of data from the host computer and storing the block of data in the buffer memory as it is being received. A series of steps are performed while the block of data remains in the buffer memory,. This series of steps includes a writing step by which a copy of the block of data and redundancy data is written to the disk. This series of steps also includes an autonomous read-verify step involving autonomously reading the block of data and the redundancy data from the disk on a succeeding rotation. While autonomously reading the block of data and the redundancy data, the read-verify step suppresses transfer to the buffer memory of the data so read; and the read-verify step tests whether the data so read are within correctable limits.

As for high-speed operation, an issue arises with respect to responding to a queue of requests. The time required to complete an autonomous read-verify after write operation can delay response to a subsequent request.

Another approach directed to reducing the risk of loss of data involves various ways to predict a forthcoming drive failure and providing a notice of the impending failure. An industry-sponsored committee has developed a relevant standard. This committee is referred to as the "Small Form Factor Committee." This standard is identified as the "Specification for S.M.A.R.T. SFF-8035 ver. 2.0." (S.M.A.R.T. is an acronym for Self-Monitoring, Analysis, And Reporting Technology.)

As for drives that provide for predicting an impending failure, such prior art drives are subject to adverse performance slowdowns with respect to reading data from sectors that fail to provide valid data on the fly.

The execution of firmware-controlled heroic-recovery techniques can consume seconds of time, this being substantially more time than the time in the order of milliseconds normally involved in completing a read command. It is highly undesirable for an operating system or application program to wait repeatedly a few seconds each time heroic-recovery techniques are invoked.

As for drives that employ autonomous verification operations as part of the overall write process, such prior art drives involve adverse performance slowdowns with respect to writing data to the sectors.

In summary of the foregoing, despite the efforts in the prior art, there remains a need to provide a comprehensive solution to meet dual goals of high reliability and fast performance—i.e., enhancing the reliability of accurate readout of data, without causing a slowdown affecting an operating-system or application program.

SUMMARY OF THE INVENTION

This invention can be regarded as a method of operating a disk drive that includes a disk defining a multiplicity of sectors. The method comprising the steps of providing a firmware-controlled state machine which can be in any of a plurality of states including an off-line in-progress state. Another step of the method is performed while the state machine is in the off-line in progress state; that is, a firmware-controlled scan of the multiplicity of sectors is performed. While performing the firmware-controlled scan, steps are performed to maintain a list of sector identifiers such that each sector identifier in the list points to a sector that has failed to provide valid data on the fly. Preferably, this list is a subset of a more general list of records, and each record includes multiple fields that are marked so that suspect sectors can be identified. Preferably, a sector is marked as a suspect sector only after it has repeatedly failed to provide valid data on the fly. Another step of the method is performed while the state machine is not in the off-line in-progress state; that is the drive responds to a request to write data at a specified sector, by determining whether the specified sector matches a sector identifier in the list, and if so, autonomously performing a read-verify-after-write operation.

Preferably, each sector pointed to by a sector identifier in the list has repeatedly failed to provide valid data despite multiple error recovery processes having been carried out. Also preferably, each sector pointed to by a sector identifier in the list has repeatedly failed to provide valid data despite a microprocessor-executed error-correction procedure having been carried out.

Preferably, the list is stored along with other defect management data in a reserved area of the disk, and as part of an initialization routine the list is read out from the disk and stored in a random access semiconductor memory so that it can be accessed rapidly during on-line operations.

BRIEF DESCRIPTION OF THE DRAWINGS

FIG. 13 is a diagram showing the logical organization of a representative RBB list containing TAREs that collectively define selection-control data for deciding whether to verify after write.

DETAILED DESCRIPTION OF A PREFERRED EMBODIMENT

Overview of General Flow

Figure 1:
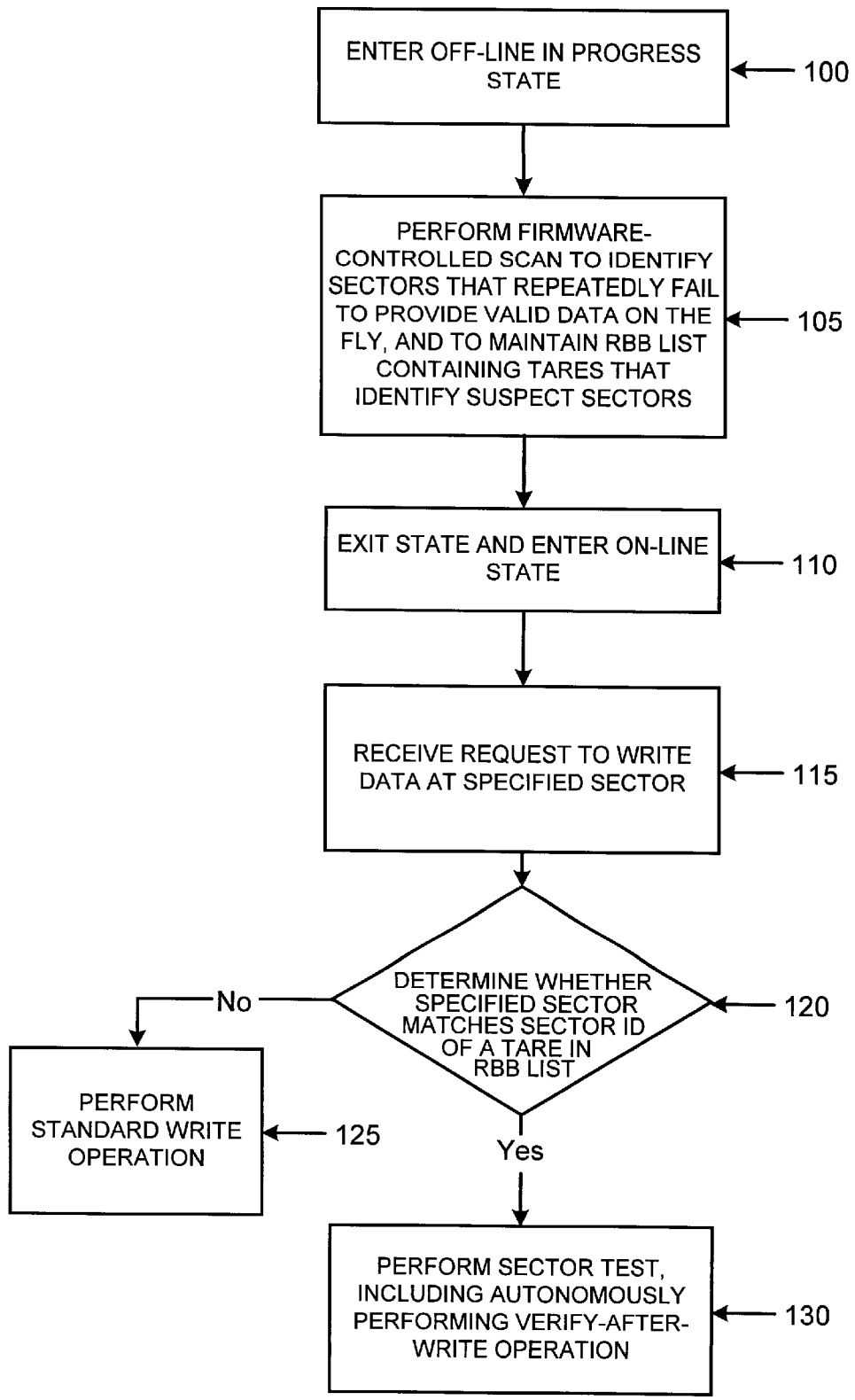
FIG. 1 is a flow chart depicting the overall flow of general steps performed in accord with the invention in operating a disk drive.

With reference to FIG. 1, there will now be described the overall flow of general steps performed in accord with the invention in operating a disk drive that has suitable structure to define a state machine and to perform autonomous scanning while in an off-line state. Such suitable structure is described below in connection with FIGS. 8 to 12.

In FIG. 1 at step 100, the state machine enters the off-line in progress state. Next, at step 105, the state machine autonomously performs a firmware-controlled scan to identify sectors that repeatedly fail to provide valid data on the fly, and to maintain a list referred to herein interchangeably as a "Relocation, Bad Block" list or "RBB" list. With reference to FIG. 13, the logical organization of a representative RBB list involves a set of records each record having a set of fields including two address pointer fields, viz, a Sector Identifier field and an Offset field. Each record also includes a set of flag fields including a TARE field, a Relocation field, and a Bad Block field. The term "TARE" is an acronym for "Transparent Auto Relocation Entry." In general, a subset of the RBB list will be entries each marked as a or "TARE." In the representative list shown n FIG. 13, the first record contains in its sector identifier field a pointer to an arbitrary LBA referred to therein as "LBA A" and this first record has its TARE flag field set to 0 to indicate it is not a TARE, its Relocation flag field set to 1 to indicate it has been relocated, its Bad Block field set to 0 to indicate it is not a bad block, and in its Offset field it contains an offset pointer ("offset A") for relative addressing. The base address for the relative addressing is the starting address for spare cylinders that provide replacement capacity for grown defects identified in the field.

The sector identifiers marked as TARE entries (i.e., "LBA B" and LBA i") point to suspect sectors that have repeatedly failed to provide valid data on the fly. Collectively, the TAREs define selection-control data for deciding whether to take the time during on-line operations to verify after write. Specific steps performed during the off-line scan are described below in reference to FIG. 2.

In FIG. 1 at step 110, the state machine exits the off-line state and enters the on-line state. At an arbitrarily later point in time, at step 15, the drive receives a request to write data at a specified sector.

According to a significantly advantageous feature, the state machine responds at step 120 by determining whether the specified sector matches a sector ID marked as a TARE in the RBB list. Specific steps performed to effect this determination are described below in reference to FIG. 7 as part of the description of the flow for responding to a sector write command.

If the test effected in step 120 returns "NO," the flow branches to step 125 at which the state machine performs a standard write operation.

If the test effected in step 120 returns "YES," the flow branches to step 130 at which the state machine performs a sector test which includes autonomously performing a verify-after-write operation. Specific steps performed during the sector test 130 are described below in reference to FIG. 6.

The above-described overall process has significant advantages. The off-line scan aspect of the process is advantageous in that suspect sectors are identified during the off-line scan without prejudicing rapid response to on-line operations. Further, the on-line aspect of the process is advantageous in that both performance and reliability are served by using the sector-identifying data in deciding whether to verify after write.

Figure 2:
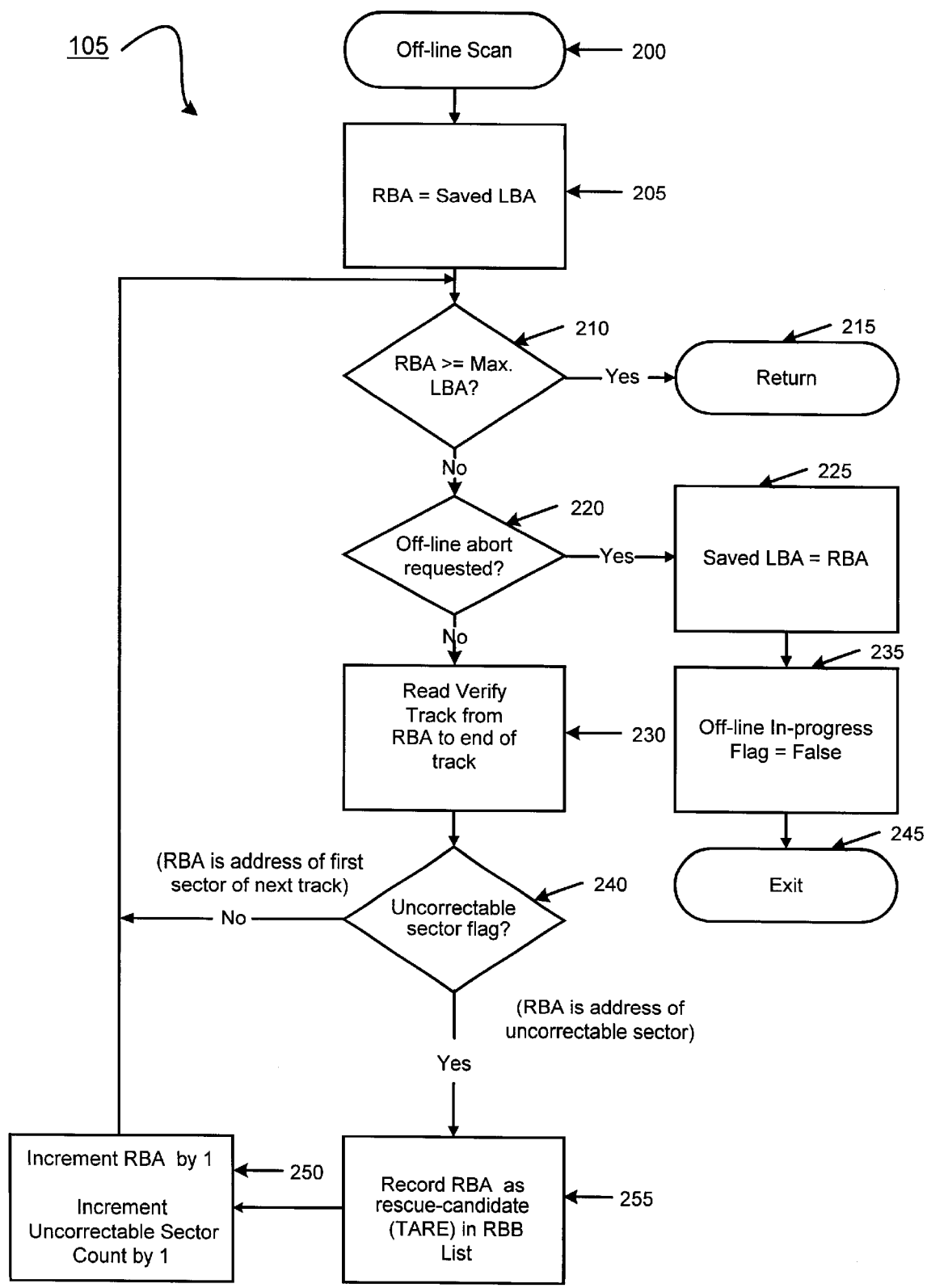
FIG. 2 is a flow chart relating to specific steps performed during an off-line firmware-controlled scan to identify suspect sectors (i.e., sectors that repeatedly fail to provide valid data on the fly) and to maintain a list referred to herein as an RBB (an acronym for Relocation, Bad Block) list containing, for each such suspect sector, a Transparent Auto Relocation Entry ("TARE").

With reference to FIG. 2, there will now be described specific steps performed during an off-line firmware-controlled scan to identify sectors that fail to provide valid data on the fly and to maintain the RBB list. In the preferred practice illustrated herein, the sectors so identified have repeatedly failed to provide valid data on the fly.

The overall flow in FIG. 2 is collectively referred to as step 105 and is headed by step 200 at which the state machine commences the off-line scan. At step 205, structure such as a register, or a memory location, or the like, that stores the requested block address (RBA) is set to a previously saved value (i.e., "RBA=Saved LBA"). The saved LBA can have a value equal to the lowest logical block address; this will be the case when entry into the off-line scan starts from the beginning. Alternatively, the saved LBA can have a value equal to the last logical block address reached during an interrupted, partial scan of the disk which was interrupted to return to the on-line state.

After step 205, the state machine at step 210 begins a looping operation by effecting a test to determine whether RBA is greater than or equal to the maximum LBA in which case the scan has been completed. The storage capacity of the drive determines the value of the maximum LBA. If the scan has been completed, the state machine exists the off-line scan as indicated by the return step at 215. Otherwise, the state machine proceeds to step 220 to effect a test to determine whether an off-line abort has been requested. If so, the state machine proceeds to step 225 and the saved LBA is set to the current RBA. If not, the state machine proceeds to step 230 to perform steps to read-verify the track from the current RBA to the end of the track, and to return a flag indicating whether an uncorrectable sector has been found. Specific steps performed during step 230 are described below in reference to FIG. 3.

If an off-line abort has been requested, the state machine proceeds from step 225 to step 235 in which the state machine sets the off-line in-progress flag to be false and then at step 245 exits the off-line state.

If an off-line abort has not been requested, the state machine proceeds from step 230 to 240 at which a test is effected to determine whether or not the flag returned via step 230 indicates that there is an uncorrectable sector. If not, the flow returns to step 210 to repeat the test whether RBA has now reached or exceeded the maximum LBA. Each time step 210 is performed after step 240 is performed, the RBA will be a higher number than on the immediately preceding pass because the RBA is increased in the course of performing step 230.

If the test at step 240 indicates that an uncorrectable sector flag had been returned, the flow proceeds to step 255 where the state machine records the RBA as a TARE in the RBB list, thereby indicating that it is a "rescue candidate" in that it is a sector that has repeatedly failed to provide data on the fly. After step 255, the flow proceeds to step 250 in which the state machine increments RBA by 1, and increments the Uncorrectable Sector Count by 1. Then the flow returns to step 210 to repeat the looping operation.

Figure 3:
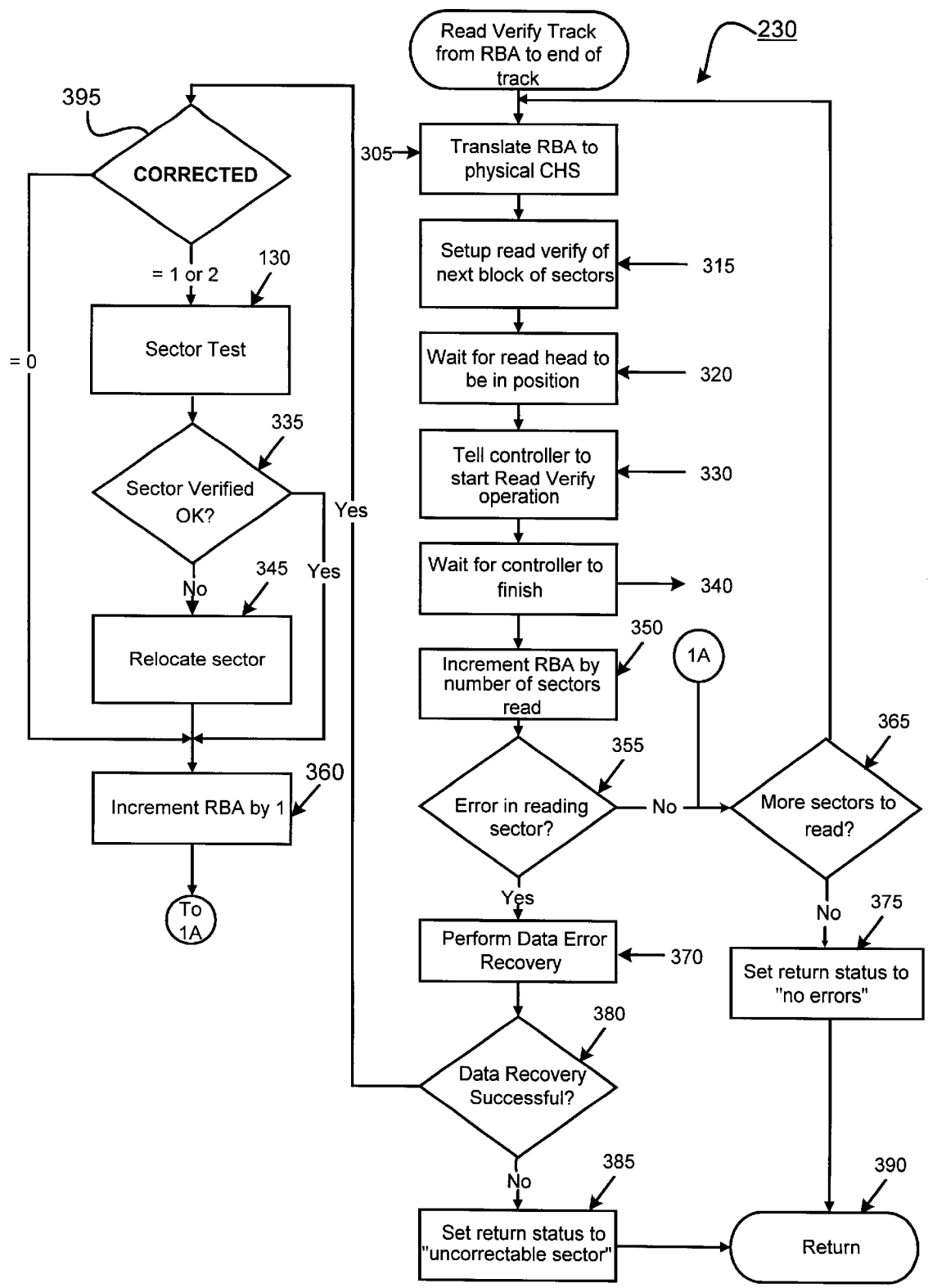
FIG. 3 is a flow chart relating to specific steps performed to read verify a track from an RBA (i.e., Requested Block Address).

With reference to FIG. 3, there will now be described specific steps performed during step 230 to read verify a track from the current RBA to the end of the track.

At step 305, the state machine begins a looping operation which starts by effecting an address translation between the LBA form of the RBA to a cylinder, head, sector ("CHS") form of address. At step 315, the state machine arranges to setup read verify of the next block of sectors. At step 320, the state machine waits for the head to be in position to read the next block of sectors. At step 330, the state machine causes the disk controller (see 1028 in FIG. 10) to start the read verify operation, during which the disk controller determines on an on-the-fly basis whether valid data have been read during the read verify operation. At step 340, the state machine waits for the disk controller to finish the read verify operation. At step 350, the state machine increments RBA by the number of sectors read during the read verify operation.

At step 355, the state machine determines whether an error occurred in reading the sector. If not, the flow proceeds to step 365 where the state machine determines whether there are more sectors to read in the rest of the track. If so, the flow returns to step 305 for another pass through the looping operation.

If in step 355 the state machine determines that an error occurred during reading, the flow proceeds to step 370 where the state machine performs data error recovery and sets a flag to indicate whether data recovery succeeded. Specific steps performed during the data error recovery process are described below in reference to FIG. 4. After step 370, the state machine in step 380 determines whether the error recovery flag indicates success. If not, the state machine proceeds to step 385 and there sets a return status flag to indicate an "uncorrectable sector" and then proceeds to step 390 to return to the calling routine (e.g., the routine disclosed in FIG. 2).

If in step 380 the state machine determines that the error recovery flag indicates success, the state machine proceeds to step 395 where a test is effected to determine what value has been returned for a variable identified as "CORRECTED." If the value of the variable "CORRECTED" is equal to 0, the flow proceeds to step 360 where the state machine increments RBA by 1 and then proceeds to step 365 (as indicated in FIG. 3 by the bubbles referencing "1A").

Figure 6:
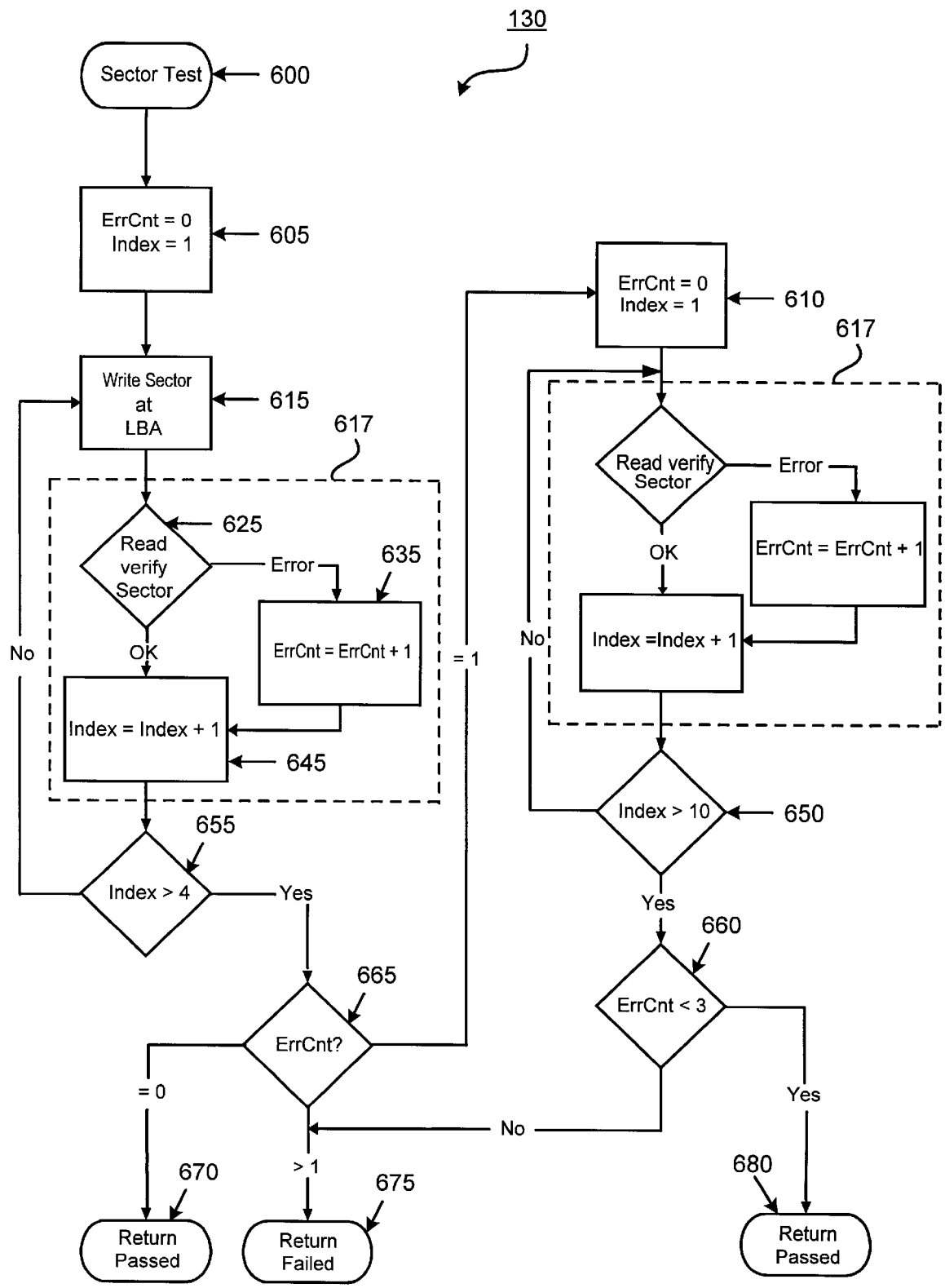
FIG. 6 is a flow chart relating to specific steps performed during a sector test.

If in step 395 the value of the variable "CORRECTED" is determined to be equal to 1 or 2, the flow proceeds to perform a sector test at step 130 (see FIG. 6).

On return from performing the sector test at step 130, the flow proceeds to step 335 where the state machine determines whether a variable set during performance of the sector test indicates that the sector test verified OK. If so, the flow proceeds to step 360 and then to step 365, which were previously described. If not, the flow proceeds to step 345 where the state machine relocates the sector in accord with conventional technology. After step 345 the flow proceeds to steps 360 and 365 which were previously described.

Figure 4:
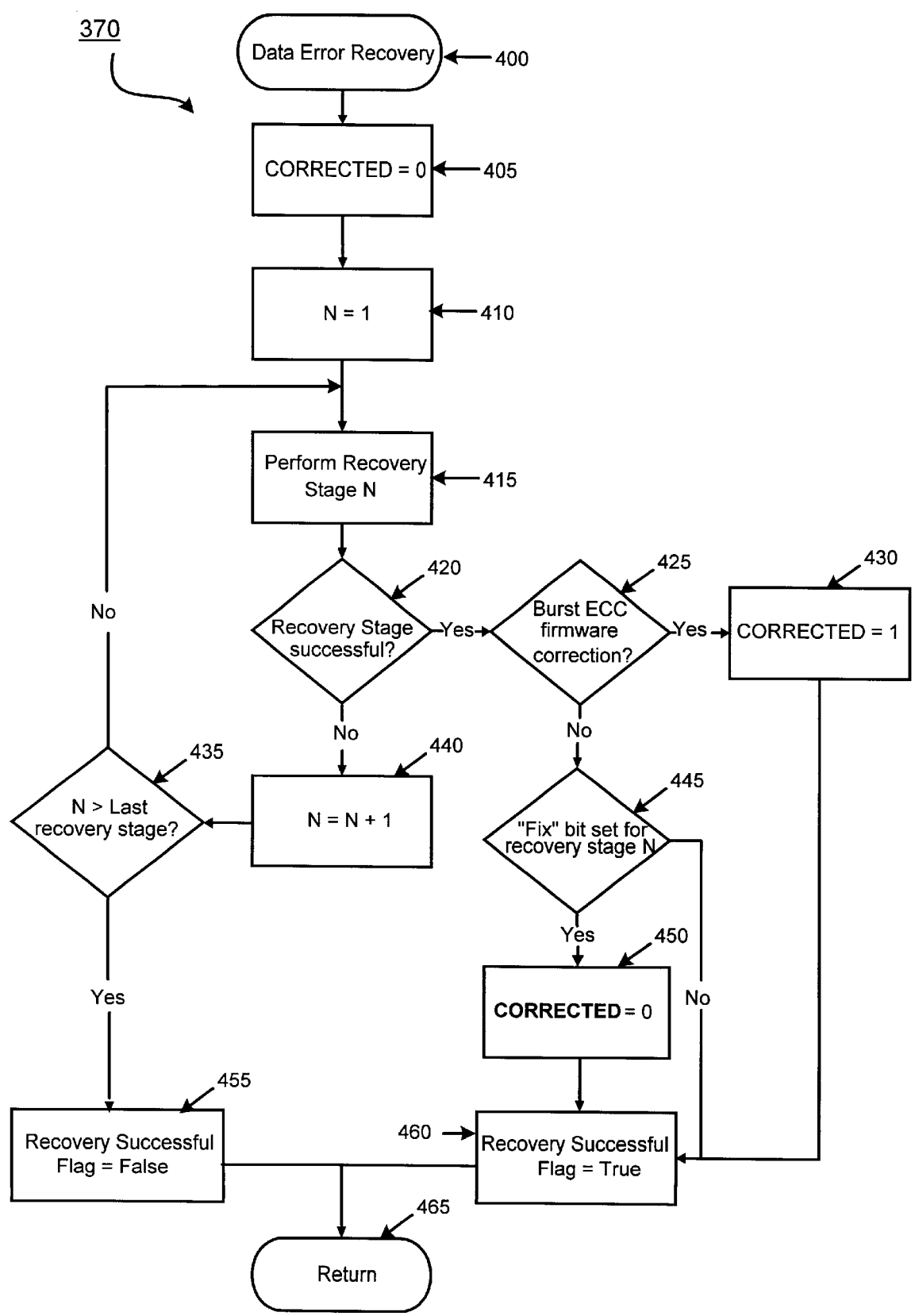
FIG. 4 is a flow chart relating to specific steps performed in a step directed to providing data error recovery.

With reference to FIG. 4, there will now be described specific steps performed during attempts to provide data error recovery. These specific steps are collectively referred to as step 370 and are headed by step 400. The state machine proceeds to step 405 at which the variable "CORRECTED" is set to 0. The flow then proceeds to step 410 in which the state machine sets a variable "N" to 1.

Next the state machine commences a looping operation that starts at step 415 in which the state machine performs a recovery stage pointed to by the value of the variable "N." The Data Guarding application (i.e., U.S. Ser. No. 09/138, 805, filed Aug. 21, 1998) discloses (see FIG. 9) suitable process flows for performing step 415.

After step 415, the flow proceeds to step 420 at which the state machine effects a test to determine whether the variable returned from the preceding step indicates that the recovery stage was successful. If not, the flow proceeds to step 440 at which the state machine increments the variable "N" and then proceeds to step 435.

In step 435, a test is effected to determine whether the variable "N" has exceeded the maximum value of "N" (i.e., the last possible recovery stage provided in step 415). If not, the flow proceeds to re-enter step 415 to perform another pass through the looping operation.

When the value of the variable "N" has been incremented to exceed the maximum number, the flow proceeds to step 455 at which the state machine sets a flag to be false thereby indicating that the recovery was not successful. Then in step 465 a return is effected to the calling routine (e.g., the routine disclosed in FIG. 3).

Returning again to step 420, if the recovery stage proves successful, the flow proceeds to step 425 at which a test is effected to determine whether the correction was effected by burst ECC firmware. If so, the flow proceeds to step 430 at which the variable "CORRECTED" is set to 1. Next, the flow proceeds to step 460 at which a flag is set to "True" to indicate that recovery was successful and then the flow returns to the calling routine via step 465.

Referring again to step 425, if the correction was effected by other than burst ECC firmware correction, the flow proceeds to step 445. There, the state machine tests whether a "FIX" bit has been set for recovery stage "N." If not, the flow proceeds to return to the calling routine via steps 460 and 465. If the "FIX" bit has been set, the flow proceeds to step 450 at which the state machine sets the variable "CORRECTED" to 0. Then, the flow proceeds to return to the calling routine via steps 460 and 465.

Figure 5:
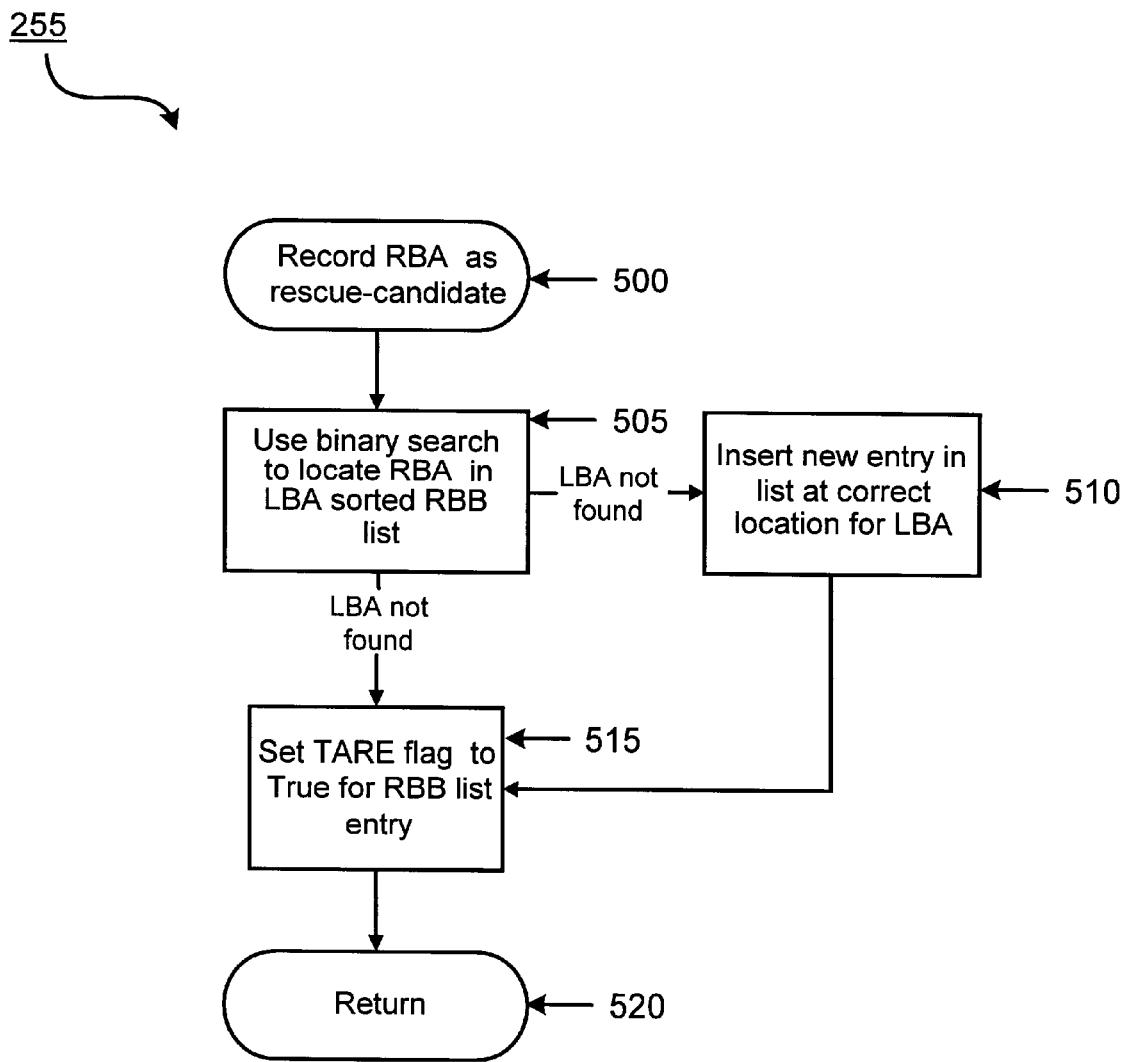
FIG. 5 is a flow chart relating to specific steps performed to record in the RBB list that a RBA is a suspect sector (aka a "rescue candidate" or a TARE).

With reference to FIG. 5, there will now be described specific steps collectively referred to as step 255. The overall flow in FIG. 5 is headed by step 500 stating "Record RBA as rescue candidate." Each RBA so recorded constitutes a sector identifier that points to a sector that has repeatedly failed to provide valid data on the fly. In so recording the RBA, the flow involves either appending a new entry to the RBB list or modifying a field in an existing entry in the RBB list.

At step 505, the state machine uses a binary search to determine whether the RBA is in the RBB list. If the RBA is not found, the flow proceed to step 510 at which the state machine inserts a new entry in the RBB list at the correct location for the LBA. After step 510 and after step 505 in the case in which the LBA was found in the RBB list, the flow proceeds to step 515. There, the state machine sets the TARE flag to True. Then, via step 520, the flow returns to the calling routine (e.g., the routine disclosed in FIG. 2).

Specific Example of Operation Durins off-line Scan

There will now be described a specific example intended to explain how in the preferred practice a list of sector identifiers is maintained such that each sector identifier in the list points to a sector that has repeatedly failed to provide valid data on the fly. In preferred practice, the list of sector identifiers constitutes a subset of the RBB list. That is, those records in the RBB list that have their TARE field set constitute the subset defining the list of sector identifiers.

In this description, an arbitrary LBA is referred to as $LBA_i$; in this example, $LBA_i$ constitutes a suspect sector. Preferably, during the manufacture of the drive, a test pattern is written into every LBA in the drive including $LBA_i$. During an off-line scan, the flow will proceed through the looping operation of FIG. 2 and eventually step 230 will be performed for such portion of a track that contains $LBA_i$. During step 230 the flow will proceed to step 355 (FIG. 3), and $LBA_i$ will fail for the first time to provide valid data on the fly. During the next step (370, specifically detailed in FIG. 4), data error recovery procedures are invoked. The number of times that each of various data recovery procedures are invoked is a parameter that can be selected on a drive design basis and could also be adaptively set. This number is a function of the number of recovery stages "N" and the number of retries employed in the various stages. In any case, two is the minimum number of times that the failure to provide valid data on the fly will be repeated, before returning to the calling routine via step 385 whereby the return status is "uncorrectable sector."

The failure of $LBA_i$ to provide valid data on the fly can be the result of an operating problem (e.g., a high-fly write) and may not be the result of a hard defect within $LBA_i$. Accordingly, it is advantageous to reserve the ability to write to $LBA_i$ while being prudent in checking that the write succeeded. Preferably, the list of suspect sectors is managed such that only sectors that have repeatedly so failed are marked as TAREs in the RBB list. An alternative would be to mark all so sectors that fail to provide valid data on the fly immediately upon the failure in step 355 (FIG. 3) of an LBA for the first time to provide valid data on the fly.

Sector Test

With reference to FIG. 6, there will now be described specific steps performed during a sector test. These steps are collectively referred to as step 130 and are headed by step 600.

At step 605, a variable "ErrCnt" is set to 0 and a variable "Index" is set to 1.

Next, the flow proceeds to commence a looping operation at step 615 where the state machine writes a sector at the current LBA. Next, the state machine performs a process collectively identified as step 617, which includes steps 625, 635 and 645. At step 625, the state machine performs a read-verify sector operation, the results of which can be either an "Error" or "OK." If "Error," the flow proceeds to step 635 at which the "ErrCnt" is incremented by 1. After step 635 and after step 625 in the "OK" case, the flow proceeds to step 645 at which the variable "Index" is incremented by 1. Then the flow proceeds to step 655 at which a test is made to determine whether the variable "Index" is now greater than 4. If not, the flow returns to step 615 for another pass through the looping operation. When the variable "Index" is greater than 4, the flow proceeds to step 665. There, the "ErrCnt" variable is examined to determine whether its value is 0, 1, or greater than 1. If 0, the flow returns to the calling routine (e.g., the routine disclosed in FIG. 1) via step 670 indicating that the sector passed the sector test. If greater than 1, the flow returns to the calling routine via step 675 indicating that the sector failed the sector test. If "ErrCnt" equals 1, the flow proceeds to step 610, at which the variable "ErrCnt" is set to 0 and the variable "Index" is set to 1. Then, the state machine again performs the group of steps collectively identified as step 617. Then, the flow proceeds to step 650, at which the variable "Index" is tested to determine whether its value now exceeds 10. If not, the flow returns to steps 617 for another pass through a looping operation. If yes, the flow proceeds to step 660, at which the variable "ErrCnt" is tested to determine whether its value is less than 3. If not, the flow returns to the calling routine via step 675 with an indication that the sector test failed. Otherwise, the flow returns to the calling routine via step 680 with an indication that the sector test passed.

Figure 7:
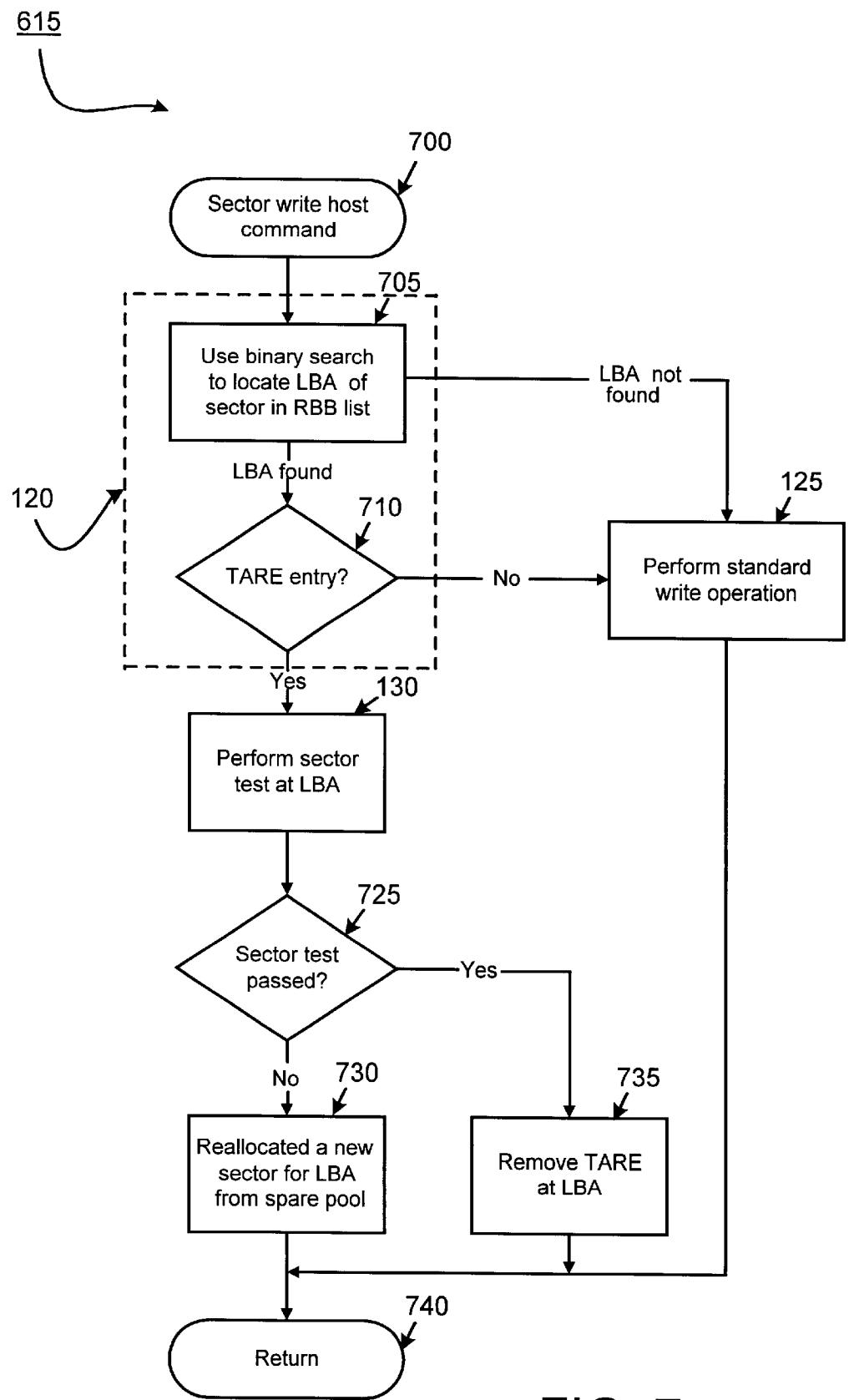
FIG. 7 is a flow chart relating to specific steps performed in response to a sector write command to provide for determining whether the specified sector matches a sector identifier in the list, and if so, autonomously performing a verify-after-write operation.

With reference to FIG. 7, there will now be described specific steps that, in response to a sector write command, are performed to provide for determining whether the specified sector matches a sector identifier in the list, and if so, autonomously performing a verify-after-write operation. These specific steps are collectively referred to as step 615 and are headed by step 700 (i.e., Sector Write Host Command). Two steps collectively identified as step 120 include step 705 and 710. The state machine at step 705 uses a binary search to determine whether the LBA of the sector is located in the RBB list. If the LBA is found, the flow proceeds to determine in step 710 whether the LBA so found is a TARE (i.e., a suspect sector that has repeatedly failed to provide valid data on the fly.

If the LBA is not found, the flow proceeds to step 125 at which the state machine causes the drive to perform a standard write operation. Then, the flow proceeds to return to the calling routine via step 740.

If the state machine in step 710 determines that the LBA matches a TARE in the RBB list, the flow proceeds to step 130 (described above with reference to FIG. 6). Next, the flow proceeds to step 725 at which the state machine examines the variable returned from step 130 to determine whether the sector test passed. If the sector test did not pass, the flow proceeds to step 730 and if it did, the flow proceeds to step 735. At step 730, the state machine reallocates a new sector for the LBA from the spare pool of sectors reserved in the drive. ???At step 735, the state machine removes the LBA from the RBB list. After step 730 and after step 735, the flow proceeds to return to the calling routine.

Environmental Structure

Figure 8:
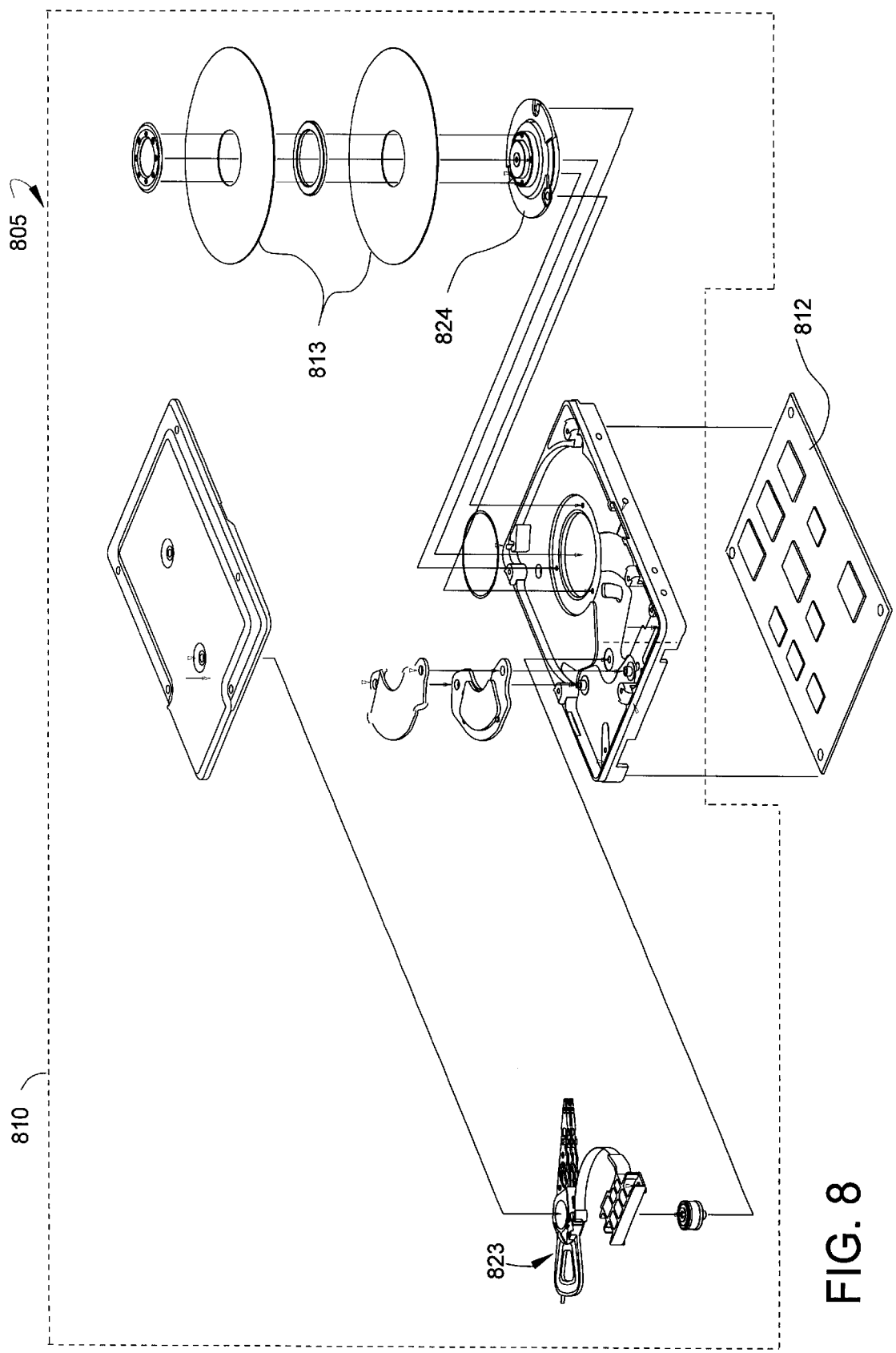
FIG. 8 is an exploded view of a magnetic hard disk drive that includes a HDA and a PCBA and that defines a suitable environment for the practice of a method in accordance with this invention.

With reference to FIG. 8, a drive 805 includes a head disk assembly (HDA 810) and a printed circuit board assembly (PCBA 812). HDA 810 suitably includes two magnetic disks 813. Each disk 813 has recording surfaces for the recording and reproduction of data transferred in connection with the execution of operating-system and application programs. The surfaces include pre-recorded embedded servo sectors used to locate and identify concentric tracks and data sectors within the tracks.

Figure 9:
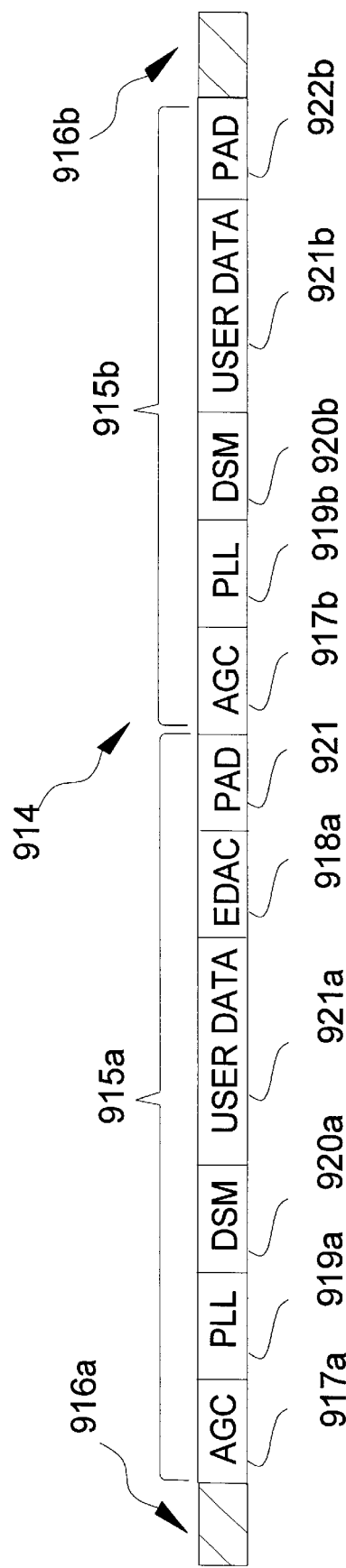
FIG. 9 is a diagram of a data track segment having a suitable format for defining multiple data sectors within a track on a recording surface of a disk in the HDA of FIG. 8.

With reference to FIG. 9, a data track segment 914 includes the fields shown diagrammatically in a straight line. Each data track segment 914 is made up of at least one data sector generally referred to herein as data sector 915*i*; and suitably includes as many as 10 data sectors. The representative data track segment shown in FIG. 9 includes two such data sectors 915*a* and 915*b*. Each data track segment 914 begins at the end of a servo track segment such as servo track segment 916*a*, and ends at the beginning of the next servo track segment such as servo track segment 916*b*. Preferably, each data sector has the same format. At least one or more of the data sectors in a given data track segment 914 may be a partial data sector or a split data sector.

Each data sector suitably starts with an AGC bit stream such as AGC 917*a* in data sector 915*a* and AGC 917*b* in data sector 915*b*. Each data sector suitably includes an Error Detection And Correction code such as EDAC 918*a* in sector 915*a*. Each data sector suitably has fields storing the following elements: a data PLL bit stream ("PLL 919*a*" in sector 915*a*, "PLL 919*b*" in sector 915*b*), a data sync mark ("DSM 920*a*" in sector 915*a*, DSM "920*b*" in sector 915*b*), userdata record ("USER DATA 921*a*" in sector 915*a*, "USER DATA 921*b* in sector 915*b*), and a data pad (PAD 922*a* in sector 915*a*, "PAD 922*b*" in sector 915*b*). An alternate embodiment may include additional fields. As illustrated by data sector 915*b*, an EDAC field need not be included in all data sectors.

During reading, each AGC field 917*a* and 917*b* defines a constant-frequency bit stream having sufficient length to enable an AGC circuit in PCBA 812 to establish a desired signal level before the immediately following DSM arrives (the index i is used herein to reference any arbitrary item such that an arbitrary DSM is referred to herein as DSM 20*i* and an arbitrary PLL field is referred to 919*i*). Each PLL 919*i* field defines a sequence of bits recorded at a constant frequency which has a sufficient number of consecutive flux reversals to enable timing circuitry in PCBA 812 to achieve phase synchronization before the immediately following DSM arrives.

Each DSM participates in framing user data to locate the first bit in its user-data record 921 and to establish byte boundaries for an ENcoding And DECoding circuit ("ENDEC") circuit in PCBA 812.

Most user-data records 921 store a fixed sized quantity of data called a "logical sector" or "logical block" as supplied during execution of operating and application programs. Typical logical block sizes are 512, 1024 or 2048 bytes with 512 bytes being the preferred length for most hard disk drives.

Each EDAC field is used by error detection and correction means to correct errors in user data recovered from user-data records while the user data are stored in a data buffer. Error detection and correction means are provided as described below.

With reference again to FIG. 8, HDA 810 also includes a head stack assembly 823 that includes heads and a supporting and movable structure for radially moving each head across the recording surface adjacent the head, and includes a spindle motor 824 for rotating the disks. PCBA 812 is connected to HDA 810 and includes electronic circuits used to control disk drive 805.

PCBA Block Diagram Description

Figure 10:
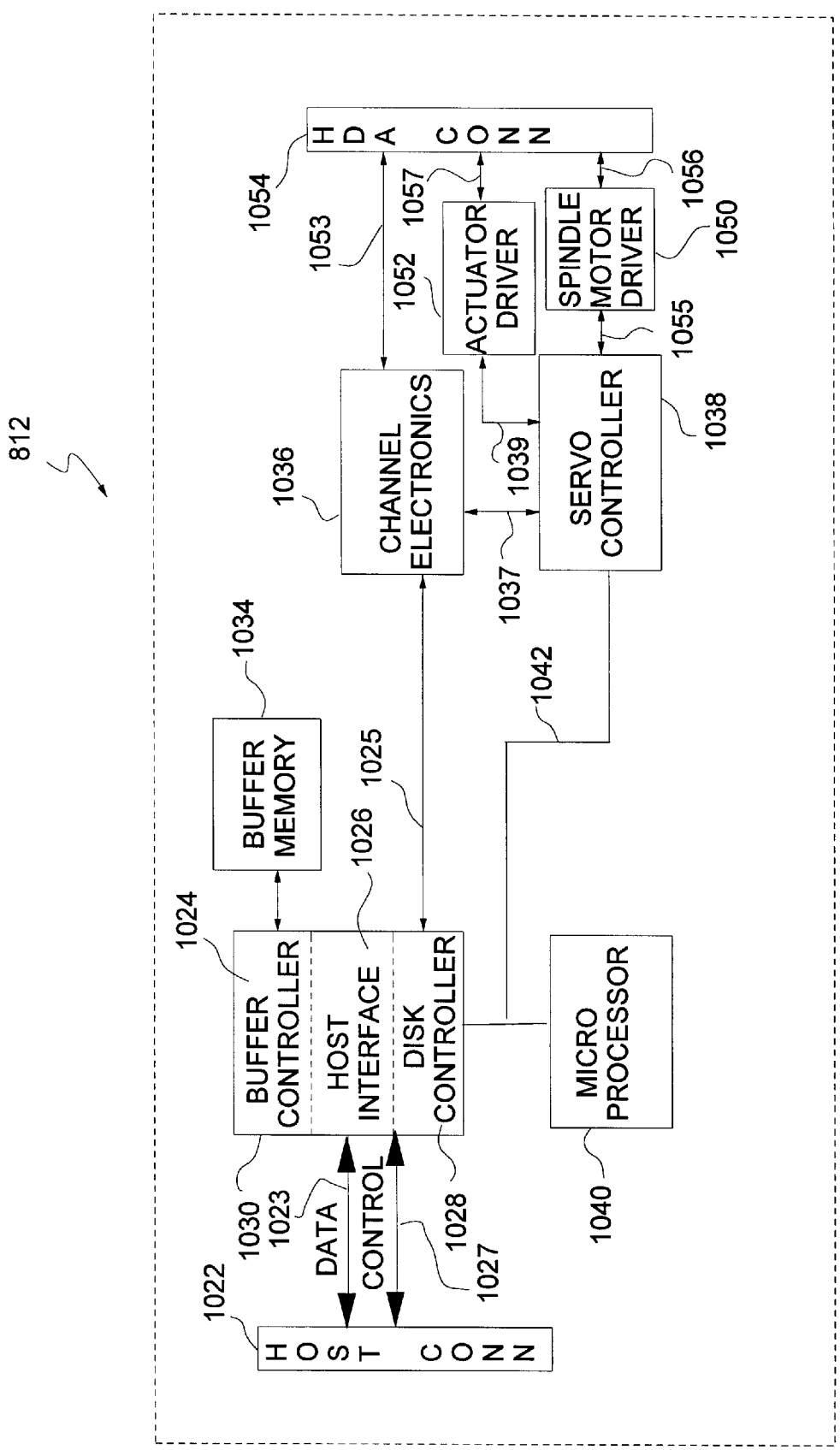
FIG. 10 is a block diagram of the PCBA of FIG. 8.

With reference to FIG. 10, PCBA 812 includes a host connector 1022, an integrated circuit controller 1030, a buffer memory 1034, channel electronics 1036, a servo controller 1038, a microprocessor 1040, a spindle motor driver 1050, an actuator driver 1052, an HDA connector 1054, and various signal paths. The signal paths include a data signal path 1023 and control signal path 1027 defined between host connector 1022 and integrated circuit controller 1030; a signal path 1025 defined between integrated circuit controller 1030 and channel electronics 1036; a signal path 1037 defined between channel electronics 1036 and servo controller 1038; a signal path 1039 defined between servo controller 1038 and actuator driver 1052; a signal path 1057 defined between actuator driver 1052 and HDA connector 1054; a signal path 1055 defined between servo controller 1038 and spindle motor driver 1050; a signal path 1056 defined between spindle motor driver and HDA connector 1054; a signal path 1053 defined between channel electronics 1036 and HDA connector 1054; and a bus 1042 defined between microprocessor 1040 and both controller 1030 and servo controller 1038.

Host connector 1022 provides for electrically connecting drive 805 to the host computer (not shown), and HDA connector 1054 electrically connects PCBA 812 to HDA 810. Integrated circuit controller 1030 includes three functional blocks: a buffer controller 1024, a host interface controller 1026, and a disk controller 1028.

Buffer controller 1024 is connected to buffer memory 1034, which may be implemented as a static random access memory (SRAM) or dynamic RAM (DRAM) in various forms including fast-page mode, extended data out (EDO) or the like. Buffer memory 1034 may be a single device; an array of devices; or in an alternate embodiment, a memory cell array integrated within the buffer controller. Buffer controller 1024 operates to provide a data path and control signals for reading and writing data in the buffer memory 1034. Data stored in buffer memory 1034 may be received from the host computer during a host write operation, or may be received from the disk 813 during a disk read operation.

Host interface controller 1026 provides a path and logic for data and control signals associated with a host bus (not shown), attached to the host computer. Host interface controller 1026 also performs command decoding and status presentation functions. In the preferred embodiment, the host bus is implemented as the ATA attachment prevalent in the personal computer industry. Other useful implementations include the SCSI bus and the SSA serial bus architecture. Host interface controller 1026 communicates with microprocessor 1040 to signal the receipt of host commands, and transfers data between the host bus and buffer memory 1034 in cooperation with buffer controller 1024.

Disk controller 1028 provides control logic for encoding and decoding data written to and read from the disk media. The data read from the disk includes position information such as track and sector identification fields, as well as user data. Disk controller 1028 also includes error detection code (EDC) and error correction code (ECC) logic, shown in FIG. 11 and later discussed, which provides means for calculating and appending redundancy codes to each block of data written to the disk and for detecting and correcting errors in the recorded block during read operations.

Microprocessor 1040 commands disk controller 1028 to perform operations through bus 1042. Commands and parameters for disk read and write operations are loaded into registers used during command execution.

Microprocessor 1040 suitably is a conventional stored program processor such as the Intel 80C196 that executes code from program memory (not shown). Program memory may be integrated within the microprocessor or implemented in an external read-only memory (ROM) or programmable read-only memory (PROM). The stored program executed by microprocessor 1040 manages the resources represented by the controller components and the HDA to optimize performance and data transfer integrity within the disk drive. In particular, the method of the subject invention is practiced by the execution of a stored program. Although in the preferred embodiment a single microprocessor is shown, alternate embodiments may implement additional microprocessors such as needed for managing the servo control functions. This invention may be practiced with equal advantage in such alternative embodiments.

Servo controller 1038 is connected to microprocessor 1040 through bus 1042 for command, data transfer and priority interrupt functions. Servo Controller 1038 is connected to channel electronics 1036 for receiving servo burst and ID field information when embedded servo fields, written on the media during the manufacturing process, are moving under the disk read heads. During disk seek operations when actuator assembly 823 of HDA 810 operates to reposition the read/write heads to a particular track on the disk media, servo controller 1038 accepts seek parameters from microprocessor 1040 and provides actuator driving signals on a control path through actuator driver 1052 and HDA connector 1054. Microprocessor 1040 confirms completion of the seek operation by reading track identification data recorded in the embedded servo fields. Once the read/write heads are positioned on the specified track, microprocessor 1040 with servo controller 1038 maintains the heads in position over the track by reading servo burst information recorded on the media, received through channel electronics 1036, and responsively applying small increments of correction to the actuator position through the above-mentioned control path.

Servo controller 1038 also contains control logic to drive disk spindle motor 824 at a precise revolution rate through spindle motor driver 1050 and HDA connector 1054. The precise rotation speed of the disk media enables channel electronics 36 to write and read data within predictable dynamic ranges.

Channel electronics 1036 includes circuits which, in write operations, transform encoded digital data into analog signals for driving the head to write magnetic flux transitions onto the disk media. During read operations, circuits in channel electronics 1036 reverse this process, transforming magnetic flux transitions detected by the head from the media surface into decoded digital data. Channel electronics 1036 is connected to the read/write heads through internal head selection logic via HDA connector 1054.

ON-THE-FLY ECC

An important part of the environment in which this invention is suitably practiced is structure for performing ECC on an on-the-fly basis and structure associated with more time-consuming error recovery procedures.

As for on-the-fly ECC, a data stream or block of data to be written on the disk is passed through an error correction code generator that produces a set of check codes that are appended to the data block written on the disk. The concatentation of the data block and the check codes form a "codeword." During a read operation, error detection code logic produces a set of "syndromes" which represent the result of a process which is complementary to the code generation process. Non-zero syndromes indicate an error in the data, and the syndromes provide information which is useful in determining the location and magnitude of the error. A type of error correction termed "on-the-fly" error correction provides methods and apparatus which enable rapid error correction processing without interrupting the microprocessor.

Typically, error correction performed on-the-fly is limited in the extent or "span" of errors which can be corrected compared to the more extensive processing which could be performed after interruption of the disk drive microprocessor. Additionally a miscorrection in the process is a possibility.

Figure 11:
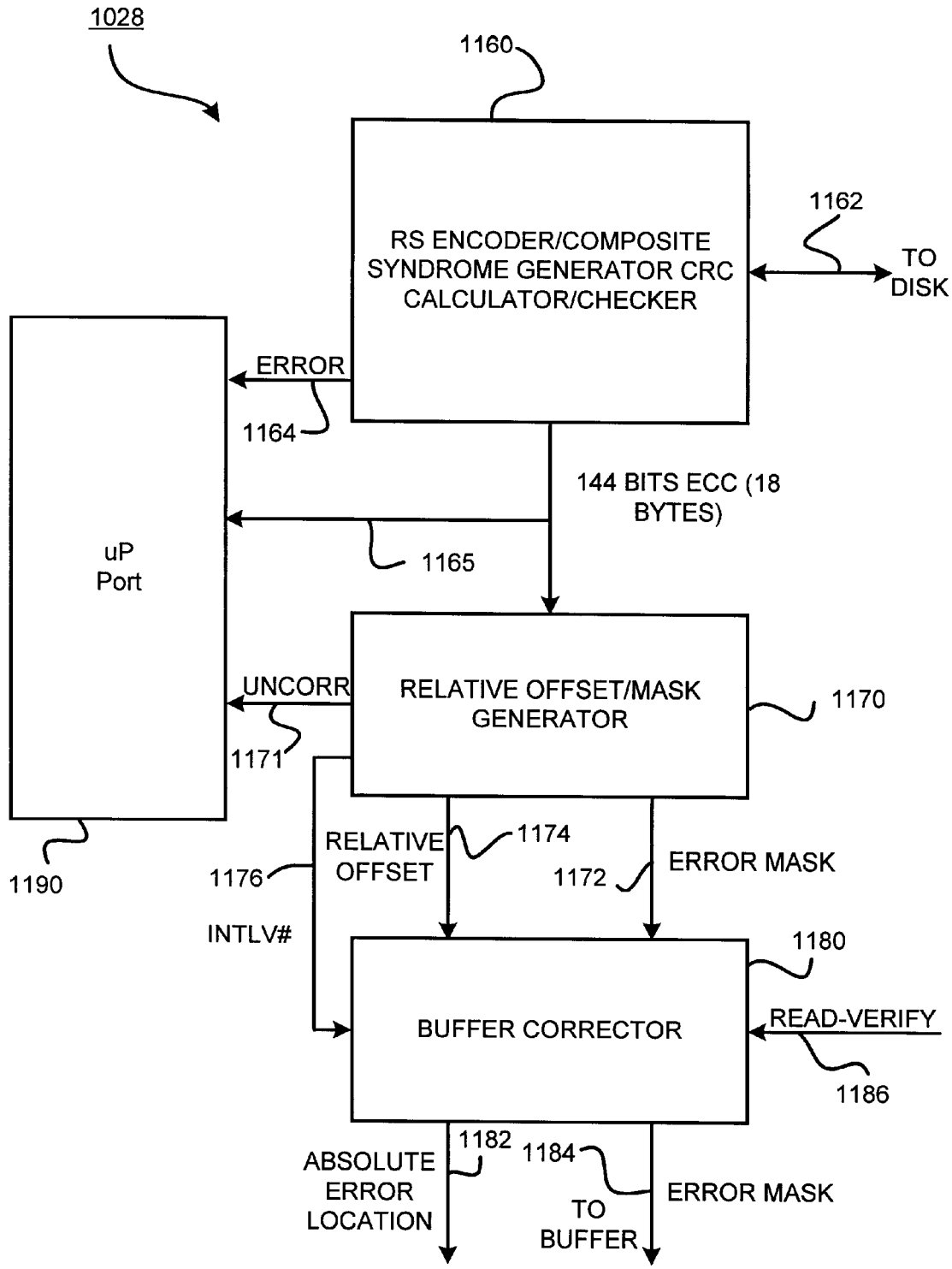
FIG. 11 is a block diagram of an error detection and correction structure in the PCBA of FIG. 8.

With reference to FIG. 11 structure which is suitably incorporated into disk controller 1028 includes a Reed-Solomon (RS) Encoder/Syndrome Generator/CRC calculator checker 1160 which generates a sequence of 4 error detection code bytes, called a Cyclic Redundancy Check (CRC). The CRC bytes are appended to the user data block when written to the disk through line 1162. The data block of 512 bytes and the concatenated 4 CRC bytes are passed through a Reed-Solomon encoding process which provides a set of 18 ECC bytes which are appended the data block and CRC during the write operation to form a complete codeword of 512+4+18=534 bytes.

RS Encoder 1160 also provides for an interleaving of the error correction code generation such that three interleaves representing respective thirds of the data block, each having corresponding 6 byte ECC (18 ECC bytes total), are processed. This allows for a correction span of one byte in each interleave during read operations which significantly improves data recovery over a single byte error correction path.

During a read operation, a codeword—comprising sequentially data, CRC, and ECC—is read from the disk on line 1162 and passed through a composite syndrome generator and CRC calculator/checker in RS Encoder 1160. If the result of the CRC check indicates an error to that point in the codeword, error line 1164 is asserted and may be read by microprocessor 1040 through uP port 1190. The remainder of the codeword, comprising the ECC bytes, is passed through the composite syndrome generator in RS Encoder 1160 to form a set of 18 syndrome bytes. If the syndrome generation results in any non-zero syndrome bytes, an error is indicated through error line 1164.

The detection of CRC errors provides an additional safeguard against miscorrections since the error control logic can validate the ECC syndrome generation by comparing the results of the CRC check against the syndrome generation. When there is both a CRC error and a non-zero syndrome, the likelihood of miscorrection is greatly reduced.

When an error is indicated, the syndrome bytes 1165 are provided to Relative Offset/Mask Generator 1170. When enabled, the logic in block 1170 computes a buffer offset address 1174 and error mask 1172 from the syndrome bytes and provides the offset address 1174, error mask 1172 and interleave number 1176 to Buffer Corrector 1180. Buffer Corrector 1180 then calculates an absolute buffer memory address 1182 and corrects the data in buffer memory 1034 through buffer controller 1024 using error mask 1184.

Because the entire correction process only requires the stored syndrome bytes and because the process can be completed before the next consecutive codeword is processed, the requirements of on-the-fly error correction are satisfied.

As for more time-consuming error recovery procedures, in some cases, when syndrome bytes 1165 are processed by Relative Offset/Mask Generator 1170, the errors in the recovered codeword may exceed the error correction span of the logic i.e. one byte per interleave. In this case, the correction of data in the buffer memory is suppressed and the Uncorrectable signal line 1171 is asserted. The state of this signal may be read by microprocessor 1040 through uP port 1190. Microprocessor 1040 may elect to attempt extended recovery of the data when Uncorrectable line 1171 is asserted. Under these circumstances the transfer of data from the disk is terminated and microprocessor 1040 reads the syndrome bytes 1165 through uP port 1190 for use in extended error correction.

Drive 805 implements a firmware state machine having conventional and innovative features. The basic component elements of the state machine are conventional in terms of including a microprocessor (e.g., 1040), by associated memory for storing instructions for its firmware control, and by memory for storing and retrieving intermediate results including data defining the current state of the state machine.

Suitably, one aspect of the state machine is its support for the S.M.A.R.T. protocol. Among other things, the state machine provides supervisory control over an off-line data collection process initiated by an Off-line Immediate command. Another, innovative off-line data collection process is initiated automatically.

As for Off-line Immediate, it is initiated by the host involving the SMART EXECUTE OFF-LINE IMMEDIATE command. Off-line data collocation then proceeds autonomously until data collection is completed or suspended or aborted. If aborted, a new SMART EXECUTE OFF-LINE IMMEDIATE command is required to restart data collection. If suspended by one of the "suspend" commands, except a STANDBY IMMEDIATE command, off-line immediate data collection will resume where it left off within 5 seconds of servicing the last interrupting command. If suspended by a STANDBY IMMEDIATE command, data collection will resume where it left off within 5 seconds of servicing the last command in the set that brought the drive out of standby.

If drive 805 is turned off while performing off-line immediate, data collection will resume after 4 minutes of idle time after power-up.

As for Automatic Off-line, it is initiated by a set of three timers: Power-on Timer, Idle Timer and Standby Timer. Power-on Timer accumulates the number of minutes the drive is on, either active, idle, standby or sleep. This timer stops counting when drive 805 is powered off. When this timer has reached its threshold (which is set in increments of ten minutes and is suitably set initially to a value corresponding to 8 hours), an off-line data collection is said to be "pending". When an off-line data collection (either automatic or immediate) completes, the Power-on Timer is set to zero and the pending condition is cleared. The Power-on Timer is nonvolatile and retains its value across power cycles.

The other two timers—Idle and Standby—both accumulate the number of seconds of power-on time since drive 805 has received a command from the host. Both have corresponding thresholds. The Idle threshold is preset to a value corresponding to 15 seconds; whereas, the Standby is initially set to zero—which means disabled. However, the Standby Threshold may be set by the host for idle periods of 5 seconds to 20 minutes, in units of 5 seconds (some products have a minimum threshold of 10 minutes). The first one of these two timers to exceed their threshold while an off-line data collection is pending, will cause an automatic data collection to begin. If the Standby Timer caused off-line data collection to begin, then the drive will enter standby mode when done collecting data. If the Standby Timer exceeds its threshold and off-line data collection is not pending, then the drive will enter standby mode at once. If the Idle Timer exceeds its threshold before the Power-on Timer exceeds its threshold (a normal occurrence), the Idle Timer will continue to count until either the power-on Timer reaches threshold or some host activity causes the Idle Timer to be reset. Note, if the Power-on timer exceeds threshold while the drive is in standby or sleep, the drive while not start an Off-line scan until a command from the host the drive out of the power save mode and then the Idle Timer has a chance to exceed threshold.

Once off-line data collection has begun via timer, it proceeds autonomously until data collection is completed or suspended or aborted. If aborted, the Power-on Timer is not reset. Once either the Idle or Standby Timers reach threshold, data collection will restart from the beginning. If suspended by one of the "suspend" commands, except a STANDBY IMMEDIATE command, automatic off-line data collection will no longer be pending, but will become pending again after 15 minutes of power-on time. Once the off-line becomes pending again, the drive must experience 15 seconds of uninterrupted idle time before resuming off-line data collection. When the off-line scan does resume, it will be at the point of suspension; it does not restart from the beginning. If suspended by a STANDBY IMMEDIATE or SLEEP command, drive 5 will behave the same as being suspended by any other "suspend" command but will not start counting the 15 seconds of idle time until the drive receives a command causing it to spin-up.

If drive 805 is turned off while an automatic off-line is pending or the drive is in the middle of performing an automatic off-line, the off-line data collection with resume after the 15 seconds of uninterrupted idle time after the drive is power-up.

Figure 12:
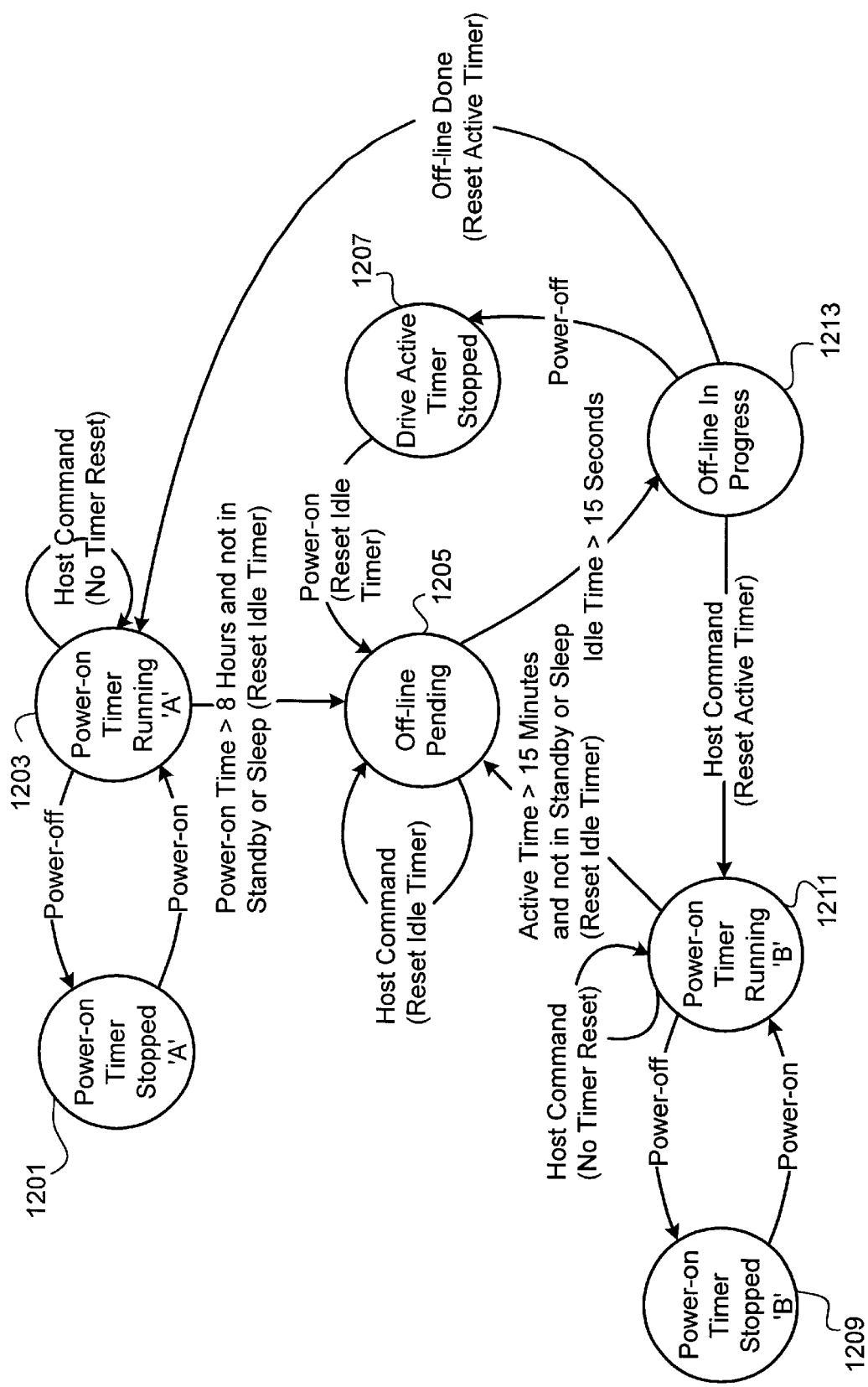
FIG. 12 is state diagram for a firmware-controlled state machine provided in the drive of FIG. 8.

With reference to FIG. 12, there will now be described the relevant states of the state diagram for a firmware-controlled state machine which can be in any of a plurality of states including an off-line in-progress state; the operation of the timers that start an Automatic Off-line scan are illustrated therein.

Suitably, the state machine defines the following states: a state 1201 for "power-on timer stopped 'A'"; a state 403 for "power-on timer running 'A'"; a state 1205 for "off-line pending"; a state 1207 for "drive active timer stopped"; a state 1209 for "power-on timer stopped 'B'"; a state 1211 for power on timer running 'B'"; and a state 1213 for "off-line in progress." Upon initialization of drive 805, state 1203 is entered forthwith after power is applied, and a relatively long duration delay is counted out; suitably this delay lasts a total of eight hours. The occurrence of a host command does not reset this counter. Each time power is removed and then reapplied, the state machine cycles through state 1201 back to state 1203.

After the total elapsed time of operation with power on (and not in Standby or Sleep), the state machine exits state 1203 and enters state 1205, the state for which an off-line scan is said to be "pending." A host command arriving during state 1205 does not change the state of the state machine to any of the other relevant states, resets the idle timer. Other ways to enter state 1205 are via exit from state 1207 and from state 1211. Exit from state 1205 results in entry into state 1213; this occurs after 15 seconds have elapsed in the Off-line pending state as measured by the Idle timer.

As for exiting state 1213 this occurs: when a host command is received, resulting in entry into state 1211; when power off occurs, resulting in entry into state 1207; and when off-line is done, resulting in entry into state 1203.

We claim:

1. A method of operating a disk drive that includes a disk defining a multiplicity of sectors, the method comprising the steps of:

providing a firmware-controlled state machine which can be in any of a plurality of states including an off-line in-progress state;

while the state machine is in the off-line in progress state, performing a firmware-controlled scan of the multiplicity of sectors;

while performing the firmware-controlled scan:
maintaining a list of sector identifiers such that each sector identifier in the list points to a sector that has failed to provide valid data on the fly;

while the state machine is not in the off-line in-progress state, responding to a request to write data at a specified sector, by:
determining whether the specified sector matches a sector identifier in the list, and if so, autonomously performing a verify-after-write operation.

2. A method according to claim 1, wherein each sector pointed to by a sector identifier in the list has repeatedly failed to provide valid data despite multiple error recovery processes having been carried out.

3. A method according to claim 1, wherein each sector pointed to by a sector identifier in the list has repeatedly failed to provide valid data despite a microprocessor-executed error-correction procedure having been carried out.

* * * * *